June 18, 1935.  T. A. W. THOMAS  2,005,275
INSULATOR FOR STORAGE BATTERY PLATES
Filed June 16, 1933
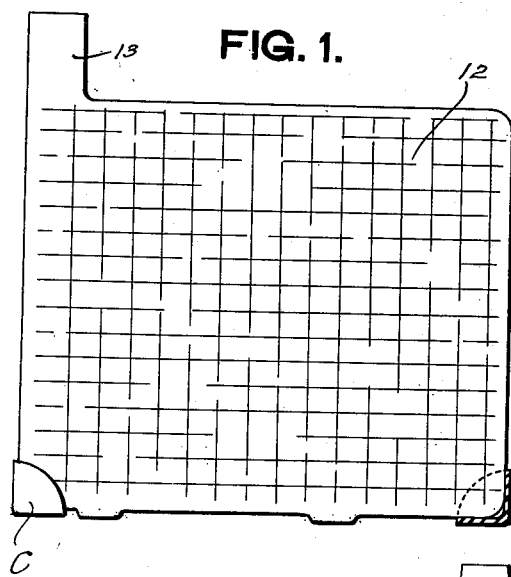
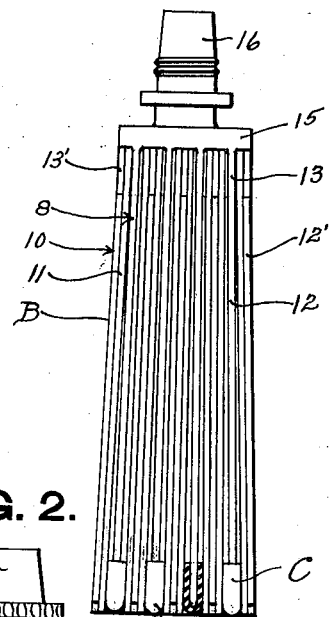
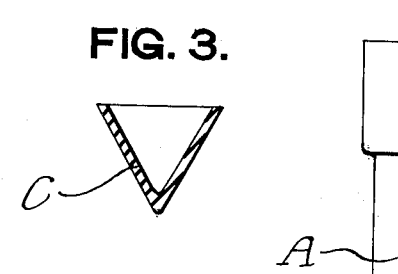
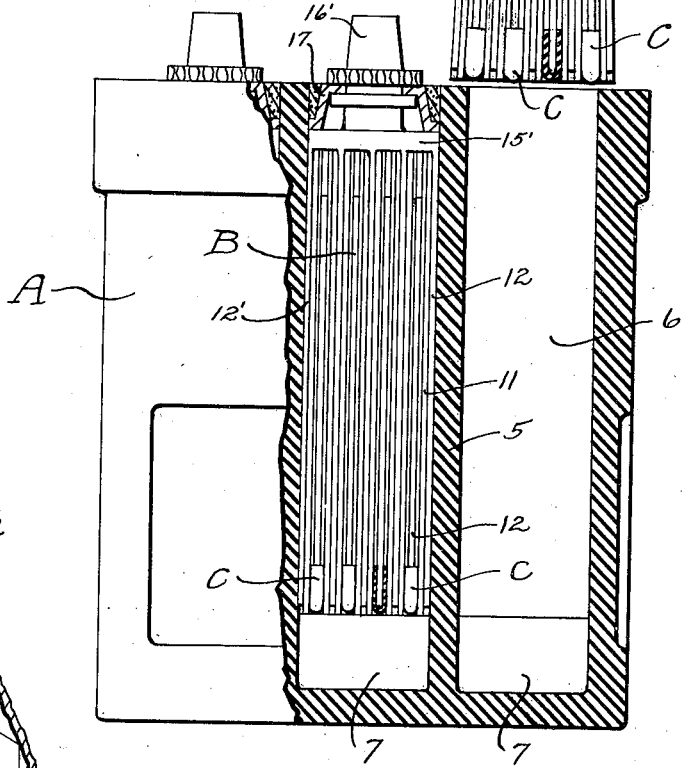
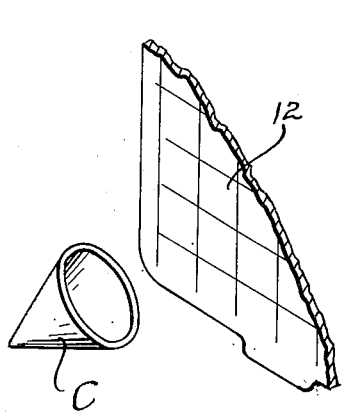
INVENTOR.
Thomas A. W. Thomas
BY Lancaster, Allwine and Rommel
ATTORNEYS.

Patented June 18, 1935

2,005,275

UNITED STATES PATENT OFFICE 2,005,275

INSULATOR FOR STORAGE BATTERY PLATES

Thomas A. W. Thomas, Los Angeles, Calif.

Application June 16, 1933, Serial No. 676,159

2 Claims. (Cl. 136—81)

The present invention relates to storage batteries and more particularly to improved insulating means for the plates thereof.

The primary object of the present invention is to provide improved insulator means for preventing short circuiting of the battery plates due to buckling or warping of the plates caused by various well known causes such as overheating, etc.

In the usual construction of storage batteries, the positive and negative plates are insulated from one another by means of sheets of insulation commercially known as separators and generally made of wood or rubber. The most common failure of storage batteries with wood separator insulation is short circuiting caused by buckled plates which have worn thru the separators so that the positive and negative plates contact one another. A large percentage of batteries having wood separator insulation fail to give full service, due to the inherent defects of wood to withstand the strain of buckled or warped plates. It has been found that buckling takes place at the lower corners of the plates, since the top of the plates in a group are held rigid by a connecting strap.

It is therefore a further object of this invention to provide an insulator adapted for positioning upon the lower corners of either the plates or the separators of storage battery elements to prevent short circuiting between the battery plates caused by buckling of the plates.

A further object of the invention is to provide an insulating cap of yieldable material which may be applied to storage battery plates or separators of different thicknesses.

A further object resides in the provision of means whereby the battery element will be firmly held against vibration within its container.

Other objects and advantages of the invention will be apparent during the course of the following detailed description, taken in connection with the accompanying drawing forming a part of this specification and in which drawing:—

Figure 1 is a view in side elevation of a conventional form of storage battery plate having its lower corners provided with the improved insulators, one of which is shown in section.

Figure 2 is a view part in section and part in side elevation of a storage battery having the insulators applied to the positive plates and showing the manner in which the plates are spread fan-shape by the insulators prior to inserting the elements into the cell compartments of the battery.

Figure 3 is an enlarged section thru one of the insulators or corner caps.

Figure 4 is a perspective view of one of the insulators and a fragmentary portion of a plate and showing the manner of applying one of the yieldable insulators to the plate.

Referring to the drawing in detail and wherein similar reference characters designate corresponding parts throughout the several views, the letter A designates a battery case or container and B the elements therefor provided with the improved insulators C for preventing short circuiting of the battery plates due to buckling.

In the example illustrated, the case or container A has been shown as being of the molded composition type divided by the vertical partition walls 5 into separate cell compartments or chambers 6 provided at their lower ends with the usual ribs or rests 7 upon which the elements B engage and are held spaced above the bottom wall of the case as is usual construction.

The elements B may be of usual construction, consisting of two assembled groups 8 and 10, and the separators 11 interposed between the plates. In the example shown, the positive group has been designated by the numeral 8 while the negative group has been designated by the numeral 10. The group 8 embodies a set of parallel positive plates 12 provided at one end of their upper edges with the usual lug 13, and which lugs are connected as by burning or the like to a connecting strap 15 provided with a terminal post 16. The group 10 embodies a set of parallel negative plates 12' provided at one end of their upper edges with the usual lugs 13', and which lugs are connected as by burning or the like to the connecting strap 15' provided with the terminal post 16'. The separators 11 are preferably of wood and one wood separator is disposed between each adjacent pair of plates 8 and 10 to insulate the positive plates from the negative plates. The assembled elements B are provided with the usual covers 17 for closing the upper ends of the cell compartments 6. The groups 8 and 10 may have a suitable number of plates and as is usual practice, the negative group has one more plate than the positive group so that a negative plate is disposed outermost at each side of the elements. These outermost negative plates are intended to have surface contact with the sides of the cell compartments 6.

Referring now to the preferred and illustrated form of the insulator C, the same is preferably of hollow conical formation and has been shown snugly fitted over the two lower corners of the positive plates 12 so as to contact the lower corner portions of the separators 11 and provide added insulation between the lower corners of the plates 8 and 10. These conical insulators or corner cushioning members C may either be made of a suitable acid resisting material such as soft rubber, celluloid, etc., or made of a substantially rigid material such as hard rubber or a similar material capable of being temporarily rendered pliable by heating the same in warm water or by other methods. These conical insulators when applied to the lower corners of the plates take a quadrant shape as shown more clearly at the lower left hand portion of the plate in Figure 1 and provide rounded edges extending from the vertical to the bottom edge of the plate. These rounded edges will prevent any of the active material that sheds from the plates from lodging on the insulators.

When insulators of soft rubber material are applied to the lower corners of the plates, the elasticity of these insulators exerts a slight tension on the adjacent separators so that the assembled plates of the battery elements are opened fan-shape at their lower edges to an extent slightly greater than the width of the cell compartments 6 as shown in Figure 2. When inserting the assembled elements into the cell compartments, the plates are first drawn together at their lower portions to compress the quadrant-shaped walls of the insulators so that the plates extend in parallel relation, and when in the cell, the tension of the yieldable insulators provides a tight fit for the elements. This tight fitting of the elements in the cell compartments is very desirable since it reduces vibration and prevents rubbing such as would cause the separators to cut thru.

While it is preferred to make the insulators of hollow conical formation and of a yieldable material such as a soft rubber so that they may be snugly fitted over practically any thickness plate or separator, the insulators may be made of a yieldable material shaped to fit the corners of the plates. When the conical insulators are made of a substantially rigid material such as hard rubber, the insulators may be heated in any desired manner to make them pliable and then snugly fitted over practically any thickness plate or separator while the insulator still retains its heat. While the insulators may, if so desired, be secured to the plates as by cementing or the like, actual use has shown that the yieldable cones require no further securing means to hold them in place for use.

Thus it will be seen that an improved means has been provided for preventing short circuiting of storage battery plates due to buckling, and which means is in the form of yieldable members adapted for positioning upon the lower corners of the plates. The corner caps or insulators will also retain all of the advantages of the low resistance desired that only wood separators provide and add the strength that is necessary to obtain uninterrupted service until the full life of the battery is used up.

Changes in details may be made to the form of invention herein shown and described, without departing from the spirit of the invention or the scope of the following claims.

I claim:

1. In a storage battery, a battery element embodying groups of interleaved plates and a separator between adjacent plates, and a hollow insulator cap of yieldable material disposed over each lower corner portion of the plates of one group with the walls thereof in surface contact with opposite faces of the plates and the confronting surfaces of like corner portions of the separators and normally spreading the lower portion of the element fan-shape.

2. In a storage battery element, groups of interleaved plates and a separator between adjacent plates, and a hollow conical-shaped insulator cap of yieldable material deformed into quadrant shape over each lower corner portion of the plates of one group and having walls of uniform thickness in surface contact with opposite faces of the plates, said walls normally spreading the lower portion of the element fan-shape.

THOMAS A. W. THOMAS.